United States Patent
Olofsson et al.

(10) Patent No.: US 9,288,069 B2
(45) Date of Patent: Mar. 15, 2016

(54) LOOP AVOIDANCE TECHNIQUE FOR THE MULTICAST CONTROL PLANE

(71) Applicant: Cisco Technology, Inc., San Jose, CA (US)

(72) Inventors: Stefan Olofsson, Dubai (AE); Ijsbrand Wijnands, Leuven (BE)

(73) Assignee: Cisco Technology, Inc., San Jose, CA (US)

( * ) Notice: Subject to any disclaimer, the term of this patent is extended or adjusted under 35 U.S.C. 154(b) by 168 days.

(21) Appl. No.: 13/792,792

(22) Filed: Mar. 11, 2013

(65) Prior Publication Data

US 2014/0254592 A1 Sep. 11, 2014

(51) Int. Cl.
*H04L 12/18* (2006.01)

(52) U.S. Cl.
CPC .................................. *H04L 12/1863* (2013.01)

(58) Field of Classification Search
None
See application file for complete search history.

(56) References Cited

U.S. PATENT DOCUMENTS

| | | | | |
|---|---|---|---|---|
| 7,684,316 | B2* | 3/2010 | Filsfils et al. | 370/222 |
| 7,898,965 | B2* | 3/2011 | Mohan et al. | 370/241 |
| 8,331,367 | B2* | 12/2012 | Chiabaut et al. | 370/390 |
| 2007/0086361 | A1* | 4/2007 | Allan et al. | 370/254 |
| 2007/0253416 | A1* | 11/2007 | Raj | 370/390 |

\* cited by examiner

*Primary Examiner* — Donald Mills
(74) *Attorney, Agent, or Firm* — Campbell Stephenson LLP

(57) ABSTRACT

The present disclosure provides for a loop avoidance technique that implements an upstream neighbor check to detect any forwarding inconsistencies. When a message is received from a neighbor routing element, an upstream neighbor check is performed to determine whether the neighbor routing element is an upstream neighbor toward a content provider of a datastream identified in the message. If the check determines that the neighbor routing element is not an upstream neighbor, then a forwarding inconsistency is not detected. If the check determines that the neighbor routing element is an upstream neighbor, then a forwarding inconsistency is detected.

21 Claims, 7 Drawing Sheets

| Upstream Neighbor List 300 | | | |
|---|---|---|---|
| Content Provider 310 | (Primary Neighbor) 320 | ECMP Neighbor 330 | LFA Neighbor 340 |
| Entry 350(1)  RP 120(1) | RE 130(N) | RE 130(2) | RE 130(3) |
| Entry 350(N)  SA 110(1) | RE 130(N) | -- | RE 130(2) RE 130(3) |
| ⋮ | | | |
| Entry 360(1)  RP 120(1) | RE 130(2) | -- | RE 130(3) |
| Entry 360(N)  SA 110(1) | RE 130(2) | -- | RE 130(3) |

LOOP AVOIDANCE TECHNIQUE FOR THE MULTICAST CONTROL PLANE

TECHNICAL FIELD

The present disclosure relates generally to multicast protocols and, more particularly, to a loop avoidance scheme that avoids building multicast loops by detecting forwarding inconsistencies.

BACKGROUND

Multicast is often the preferred method of communication for many common network distribution applications. This is so because multicast is a bandwidth-conserving technology that reduces traffic by simultaneously delivering data to multiple hosts, or receivers. Once receivers have joined a multicast group, a server or source responsible for sending content need only send the content to the multicast group address, rather than sending the content to each individual receiver or to all receivers on the network.

BRIEF DESCRIPTION OF THE DRAWINGS

A more complete understanding of the present disclosure may be acquired by referring to the following description and accompanying drawings, in which like references numbers indicate like features.

Figure 1:
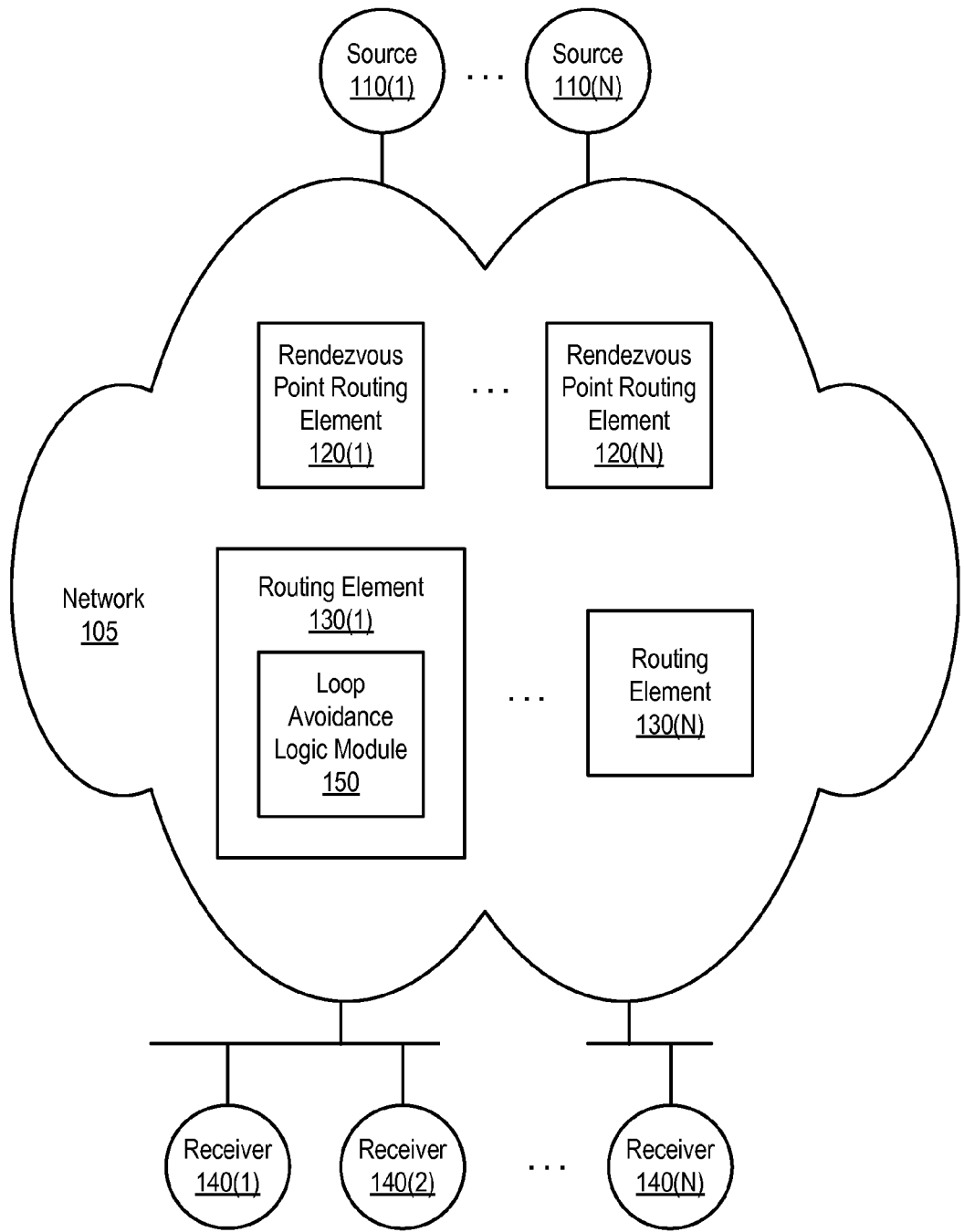
FIG. 1 is a block diagram illustrating components of an example network in which the present disclosure can be implemented, according to one embodiment.

While the present disclosure is susceptible to various modifications and alternative forms, specific embodiments of the present disclosure are provided as examples in the drawings and detailed description. It should be understood that the drawings and detailed description are not intended to limit the present disclosure to the particular form disclosed. Instead, the intention is to cover all modifications, equivalents and alternative falling within the spirit and scope of the present disclosure as defined by the appended claims.

DETAILED DESCRIPTION

Overview

The present disclosure provides for a loop avoidance technique that implements an upstream neighbor check to detect any forwarding inconsistencies. When a message is received from a neighbor routing element, an upstream neighbor check is performed to determine whether the neighbor routing element is an upstream neighbor toward a content provider of a datastream identified in the message. If the check determines that the neighbor routing element is not an upstream neighbor, then a forwarding inconsistency is not detected. If the check determines that the neighbor routing element is an upstream neighbor, then a forwarding inconsistency is detected.

Example Embodiments

FIG. 1 is a block diagram illustrating components of an example network 105 in which the present disclosure can be implemented. Network 105 is configured to support IP (Internet Protocol) multicast, and communicatively couples multicast sources 110(1)-(N), receivers 140(1)-(N), routing elements 130(1)-(N), and/or rendezvous point routing elements 120(1)-(N). Each component is discussed in further detail below.

Multicast sources 110(1)-(N) each provide a different datastream, or content that is distributed as multicast packets, to one or more multicast groups. Other sources 110 in the network can provide duplicate datastreams to one or more multicast groups as anycast sources. Sources 110(1)-(N) can each be identified by a source address S (such as an IP address) and each multicast group can be identified by a multicast group address G (such as an IP address). Each multicast group can include one or more receivers 140(1)-(N) that are subscribed to the multicast group to receive the content. Sources 110(1)-(N) and receivers 140(1)-(N) can be implemented using, for example, a desktop computer, a laptop computer, a workstation, a server, or the like.

Routing elements 130(1)-(N) and rendezvous point routing elements 120(1)-(N) are representative of network elements that perform packet routing in a network, such as network 105. Each rendezvous point (RP) routing element 120 is a routing element that has been configured to act as a root of a shared tree, where multicast sources provide content to the RP and the RP distributes the content to receivers (as further discussed below). Rendezvous points 120(1)-(N) can have routing capabilities similar to or differing from routing elements 130(1)-(N). Routing elements 130(1)-(N) and RP routing elements 120(1)-(N) can each be identified by a routing element identifier (ID) (such as a 32-bit number assigned to a routing element that uniquely identifies the routing element in the network), a network address (such as a hardware MAC (Media Access Control) address), an IP address, and/or another value that identifies the routing element.

Routing elements 130(1)-(N) implement a routing protocol, such as IGP (Interior Gateway Protocol), and are configured to exchange routing information with each other about network 105. In the embodiments described herein, the routing protocol implemented in network 105 is a link state routing protocol, such as OSPF (Open Shortest Path First) protocol and IS-IS (Intermediate System to Intermediate System) protocol. Routing elements 130(1)-(N) also implement a multicast protocol, such as PIM (Protocol-Independent Multicast) and mLDP (Multicast Label Distribution Protocol), where mLDP is implemented in an MPLS (multiprotocol label switching) network. Multicast protocols typically do not include a separate topology discovery mechanism, but instead rely on the routing information maintained by the routing protocol to provide loop free paths to a content provider, such as a multicast source 110 or an RP routing element 120. The multicast protocol (or multicast control plane) is responsible for maintaining multicast packet distribution trees (or more simply, multicast trees) that distribute multicast datastreams (e.g., content) provided by content providers to requesting receivers. The multicast control plane maintains multicast trees by causing routing elements 130(1)-(N) to exchange multicast control plane messages (e.g., PIM join/prune messages and mLDP label mapping/withdraw messages), as further discussed below.

Routing elements 130(1)-(N) that implement a link state routing protocol are configured to exchange link state advertisements (e.g., floods link state advertisements). A link state advertisement (LSA) includes topology information local to the routing element originating (e.g., generating) the LSA. An LSA identifies the links and routing elements that are directly coupled to the originating routing element, as well as the metric cost associated with each link. Each routing element stores a copy of the most recent version of each LSA in a link state database, where the link state database stores topology information that completely describes the links or paths connecting routing elements 130(1)-(N) in network 105. Once LSAs have been exchanged and stored among routing elements 130(1)-(N), the link state databases of each routing element are synchronized (e.g., are identical), and thus the routing elements converge on an identical view of the network topology of network 105, also referred to herein as convergence. The time during which the link state databases are being synchronized is referred to herein as convergence time. Convergence time is variable and is related to the size of the network and the processing power of routing elements 130(1)-(N).

Using the topology information stored in the link state database, each routing element independently computes the shortest path (also referred to herein as the best path), based on metric cost, from itself to each other routing element in network 105 using a shortest path algorithm (e.g., Dijkstra's algorithm). Metric costs are assigned by a network administrator and reflect the preference of using a particular link or routing element interface coupled to the link. Metric costs can reflect, for example, bandwidth, delay, availability and/or reliability factors. The computed shortest paths form a shortest path tree that provides a loop-free path from a computing routing element (or the routing element that computes the shortest paths) to each other routing element in network 105. The shortest paths are then used to generate routing information that can be used to reach each routing element in network 105. If multiple shortest paths to a destination routing element exist, one path is selected as the primary path. Each routing element stores the routing information in one or more routing and/or forwarding tables configured on the routing element.

Routing elements 130(1)-(N) that implement a multicast protocol are configured to perform tree maintenance (e.g., build or modify a multicast tree or branch thereof), in response to receiving a multicast control plane message. The multicast control plane message identifies a datastream (such as by including a source address S and/or a multicast group address G that identifies the datastream). The routing element can send another multicast control plane message (which also identifies the datastream) to a next-hop routing element toward the content provider of the identified datastream to continue building or modifying the multicast tree, or branch thereof, as needed. Each routing element can determine the next-hop routing element by consulting the routing information (e.g., a routing table and/or a label information base) maintained by the routing protocol to discover the best path to the content provider. The routing information identifies an upstream interface toward the content provider (also referred to as an RPF (reverse path forwarding) interface), where the next-hop routing element is directly connected to the upstream interface. The routing element also stores multicast state information that describes the multicast tree (e.g., when building a multicast tree, the routing element stores the interface towards the content provider as an incoming interface and stores the interface on which the multicast control plane message was received as an outgoing interface). The receiving next-hop routing element in turn performs tree maintenance, in response to receiving a multicast control plane message. The tree maintenance process continues hop-by-hop (e.g., to continue building or pruning the tree, as needed) toward the content provider.

Once tree maintenance is complete, packets of the identified datastream are distributed along the multicast tree, or branch thereof, from the content provider to one or more receivers that are subscribed to receive the datastream. Thus, the best paths that reach a content provider are also used when forwarding a datastream from the content provider to a requesting receiver.

One type of multicast tree is a source-based tree, where a single multicast source is the root of the tree and serves as the single content injection point for the source-based tree. Another type of multicast tree is a shared tree, where a rendezvous point is the root of the tree. One or more multicast sources use the shared tree to distribute content to one or more multicast groups. For example, several multicast sources provide content to the rendezvous point, which forwards the content downstream (away from the rendezvous point) to receivers. Unidirectional source-based and shared trees that have a single content injection point are also referred to as a point-to-multipoint (P2MP) label switched path (LSP) in an mLDP-controlled network. A shared tree can also be bi-directional, where content can be forwarded upstream (towards the rendezvous point) as well as downstream to receivers. The one or more multicast sources, which have various locations in network 105, each serve as a content injection point for the shared tree. A bi-directional shared tree that has multiple content injection points is also referred to as a multipoint-to-multipoint (MP2MP) LSP in an mLDP-controlled network.

To keep track of the different multicast trees distributing various datastreams that traverse or terminate at a given routing element, the multicast protocol of the routing element stores multicast state information that describe the multicast trees, where the multicast state information includes a set of multicast state entries. A multicast state entry for a multicast tree includes a source and multicast group address pair or tuple that identifies the datastream being distributed by the multicast tree. The tuple can be notated as (S, G) when content from a particular source S is requested, or as (*, G) when the multicast state entry applies to any source providing content to multicast group G. For shared trees, each multicast group G distributed by the shared tree has a separate multicast state entry, which can also identify the RP routing element of the shared tree (e.g., can include an identifier of the RP routing element). A multicast state entry also includes an incoming interface (indicating the interface on which packets are received) and one or more outgoing interfaces (indicating the interfaces on which packets are forwarded). Multicast state information can be stored across one or more routing and/or forwarding tables configured on the routing element.

The present disclosure is implemented in loop avoidance logic module 150 configured on one or more routing elements 130(1)-(N), which is further discussed below. Loop avoidance logic module 150 is a lightweight extension to existing multicast control plane logic. Loop avoidance logic module 150 provides a loop avoidance technique in multicast networks. By utilizing a loop free alternate (LFA) capability supported by a link-state unicast routing protocol, loop avoidance logic module 150 obtains knowledge of the upstream neighbors of a multicast content provider and shares that knowledge with the multicast control plane. Loop avoidance logic module 150 provides a hold down function for multicast control plane messages (e.g., a tree building message, such as a PIM join message or an mLDP label mapping message) that are received from upstream neighbors to avoid creating multicast loops due to transient inconsistencies in routing information during convergence. Thus, the loop avoidance technique implemented by loop avoidance logic module 150 reduces the number of multicast control plane messages that are exchanged during convergence and avoids creating loops that may lead to traffic storms. However, loop avoidance logic module 150 does not guarantee that all loops will be eliminated during convergence. The effectiveness of the loop avoidance technique relies on the accuracy of the LFA capability to identify LFAs for a content provider.

Examples of network 105 include a local area network (LAN) utilizing Ethernet, IEEE 802.11x, or some other communications protocol, and an MPLS network (such as a transport or provider network that couples two or more networks such as customer networks). In light of the present disclosure, it will be appreciated that network 105 can include other components such as routers, firewalls and the like that are not germane to the discussion of the present disclosure and will not be discussed further herein. It will also be appreciated that other configurations are possible. For example, a much larger number of sources 110(1)-(N), receivers 140(1)-(N), routing elements 130(1)-(N), and/or rendezvous point routing elements 120(1)-(N) than the number shown can be implemented in the network, and so on.

The letter N is used to indicate a variable number of devices or components. For example, a variable number of sources 110(1)-(N), routing elements 130(1)-(N), rendezvous point routing elements 120(1)-(N), and receivers 140(1)-(N) are implemented in the network. Although the letter N is used in describing a variable number of instances of each of these different devices and components, a repeated use of the letter N does not necessarily indicate that each device and component has a same number of N instances implemented in the network.

Figures 2, 3:
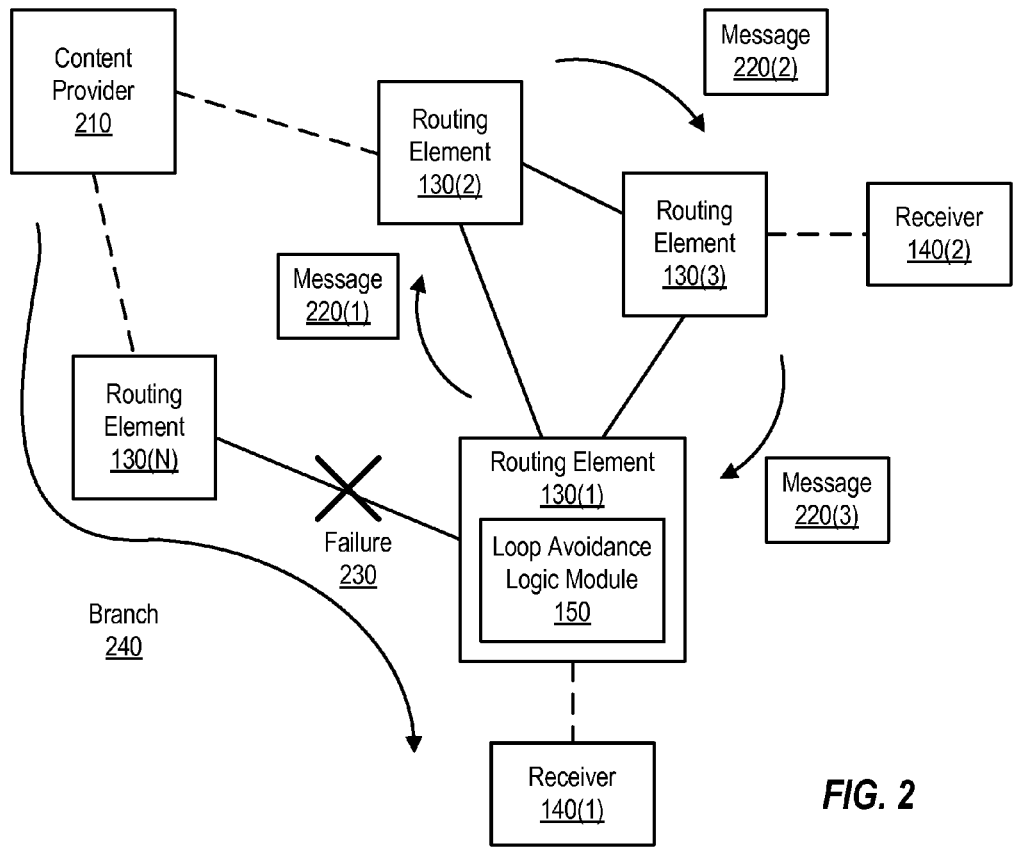
FIG. 2 is a block diagram illustrating components of an example routing element configuration, according to one embodiment.
FIG. 3 is a block diagram illustrating components of an example upstream neighbor list, according to one embodiment.

FIG. 2 is a block diagram illustrating components of an example routing element configuration in network 105. When a network topology change occurs in network 105 (such as a failure of a link or a routing element), a routing element directly connected to the topology change detects the topology change. In the embodiment illustrated, routing element 130(1) is directly connected to a link failure 230 (where failure 230 could also be a failure of routing element 130(N)). In response, the routing protocol of routing element 130(1) originates (e.g., generate) and floods a new LSA that reflects the topology change. The new LSA is also updated to the originating routing element's link state database, which is used to update the routing information (e.g., compute new shortest paths that reflect the topology change). Also, as illustrated, a multicast tree or branch thereof (also referred to as multicast tree branch 240) traverses routing element 130(1) and distributes a datastream provided by content provider 210. Due to the topology change, multicast tree branch 240 no longer has (upstream) connectivity towards content provider 210. In response to detecting multicast tree branch 240 no longer has upstream connectivity, the multicast protocol of routing element 130(1) attempts to restore connectivity by sending a multicast control plane message to a next-hop routing element (e.g., a PIM join message or mLDP label mapping message).

Routing elements that are farther away from the topology change will eventually receive the new LSA and will update their link state databases and routing information. Thus, the routing elements that are closer to the topology change will generally converge faster than the routing elements that are farther away (e.g., are downstream) from the topology change. Also, routing elements with more processing power will converge faster than routing elements with less processing power. Thus, different routing elements may have different (transient) views of the network topology before convergence is complete. If a multicast control plane message is received by a routing element downstream of the topology change before the routing element has been able to complete convergence of its routing information, the routing element's multicast protocol (according to conventional multicast protocol rules) will process the multicast control plane message using the present routing information, which is stale (i.e., the routing element has a transient view of the network topology that does not reflect the current network topology).

Processing multicast control plane messages using stale routing information might lead to loop conditions for multicast traffic in the network. Loops are potential sources of traffic storms and could have severe consequences on overall traffic in the network. For example, after routing element 130(1) has updated its routing information to reflect failure 230, routing element 130(1) discovers a new best path to content provider 210 via a neighbor (or directly connected) routing element 130(2) and sends a multicast control plane message 220(1) to routing element 130(2) in order to repair multicast tree branch 240. Routing element 130(2) is downstream from the topology change (or failure 230) but is also upstream toward content provider 210, according to the current network topology. If routing element 130(2) has stale routing information (e.g., routing element 130(2) has not converged and is unaware of the topology change), the stale routing information will still indicate that routing element 130(1) is the best path to content provider 210. Using the stale routing information, routing element 130(2) discovers the path to routing element 130(1) and sends a second multicast control plane message (not shown) back to routing element 130(1) in order to repair the same multicast tree. If routing elements 130(1) and 130(2) build the tree as requested, a loop between routing elements 130(1) and 130(2) is created.

Typically, such a loop is avoided by performing a forwarding check, such as an RPF (Reverse Path Forwarding) check, to determine any forwarding inconsistencies. In response to receiving a multicast control plane message (or more simply, message), a routing element determines the upstream interface (or RPF interface) toward the content provider of the datastream identified in the message. The routing element then compares the receiving interface (on which the message is received) with the upstream interface. A message that is received on an upstream interface toward the content provider fails the forwarding check and is dropped. As a result, the loop is avoided.

However, if the loop involves one or more intermediate routing elements, such as routing element 130(3), a routing element may not be able to determine that a loop exists. Continuing the above example, routing element 130(1) (which has converged routing information) determines that the new upstream interface towards content provider 210 is connected to routing element 130(2). In response, routing element 130(1) sends a first multicast control plane message 220(1) to routing element 130(2), which has stale routing information. Stale routing information may reflect network topology before failure 230, and/or may reflect other topology changes of which routing element 130(1) is unaware (where, in such a scenario, routing element 130(1)'s routing information is only locally converged).

The stale routing information of routing element 130(2) indicates that the upstream interface toward content provider 210 is connected to routing element 130(3). Since the upstream interface is not the same interface on which message 220(1) is received, the forwarding check is passed. In response, routing element 130(2) sends a second multicast control plane message 220(2) to routing element 130(3), which also has stale routing information. The stale routing information of routing element 130(3) indicates that the upstream interface toward content provider 210 is connected to routing element 130(1). Since the upstream interface is not the same interface on which message 220(2) is received, the forwarding check is passed. In response, routing element 130(3) sends a third multicast control plane message 220(3) to routing element 130(1). The converged (or locally converged) routing information of routing element 130(1) still indicates that the upstream interface toward content provider 210 is connected to routing element 130(2). Since the upstream interface is not the same interface on which message 220(3) is received, the forwarding check is passed. Since messages 220(1)-(3) passed the forwarding checks, routing elements 130(1)-(3) build the particular multicast tree or branches as requested, which creates a loop between the three routing elements.

If the particular multicast tree is a uni-directional tree (such as a source-based tree or a uni-directional shared tree), the loop is eventually pulled down and the multicast tree is (correctly) built to reach content provider 210 once the routing information of routing elements 130(1)-(3) converges. Thus, the three multicast control plane messages that were exchanged while convergence was incomplete were not only unnecessary, but also caused partial tree-building that needed to be corrected after convergence. Such correction causes additional overhead in the multicast control plane due to the multicast control plane messages that are needed to pull down the loop (such as PIM prune messages and mLDP label withdraw messages) in addition to the (necessary) multicast control plane messages that correctly build the tree to content provider 210 (such as PIM join messages and mLDP label mapping messages). A traffic storm is not a concern in such a scenario, since routing element 130(1) does not have connectivity with content provider 210 and routing element 130(2) has not established a new path to content provider 210, meaning that any packets provided by content provider 210 cannot enter the loop (and in fact will not reach the receivers 140 until routing element 130(2) has converged and updated the multicast tree or branch thereof).

If the particular multicast tree is a bi-directional tree with one or more additional content injection points that still have connectivity with the multicast tree, the content injection points continue to provide content that is forwarded along branches of the multicast tree. For example, a source (not shown) that is downstream from 130(1) provides content that travels upstream towards routing element 130(1) on tree branch 240. Once the content reaches routing element 130(1), the packets enter the loop and are forwarded among routing elements 130(1)-(3) repeatedly. The incoming and forwarded packets continue to feed the loop and cause a traffic storm (e.g., excessive traffic) that can quickly consume bandwidth and processing power of the looped routing elements, degrading performance of the routing elements to an effective standstill. The traffic storm causes a disruption (or effective failure) in packet distribution at routing elements 130(1)-(3), which further delays convergence of routing elements 130(1)-(3) and also prevents other sources from delivering content to receivers via this branch of the bi-directional tree.

However, if routing element 130(1) was aware that routing element 130(3) was also an upstream neighbor towards content provider 210 (meaning that message 220(3) was received on an interface equivalent to an upstream or RPF interface leading to content provider 210), routing element 130(1) would be able to detect the forwarding inconsistency and would avoid creating a loop. Thus, loop avoidance logic module 150 is configured to determine the complete set of upstream neighbors for each active content provider whose content is forwarded by routing element 130(1). Loop avoidance logic module 150 is also configured to perform an upstream neighbor check on a received message, using the upstream neighbor list, in order to detect any forwarding inconsistencies.

The set of upstream neighbors are determined in a converged network (e.g., are determined at a time before a failure occurs and/or at a time after convergence from a failure). Loop avoidance logic module 150 determines any ECMP (equal cost multi-path) neighbors and/or any LFA (loop free alternate) neighbors that provide alternate paths that lead to each active content provider, as further discussed below. The set of upstream neighbors that lead to a content provider are associated with the content provider in an entry stored in an upstream neighbor list.

When a multicast control plane message (or more simply, a message) is received by a particular routing element (also referred to herein as a computing routing element) from a neighbor routing element, loop avoidance logic module 150 performs an upstream neighbor check on the message to determine whether the neighbor routing element is an upstream neighbor toward the content provider that provides the datastream identified in the message. If the check determines that the neighbor routing element is not an upstream neighbor (e.g., the check is passed), then a forwarding inconsistency is not detected, and the message is processed as normal by the multicast control plane without risk of causing a loop. If the check determines that the neighbor routing element is an upstream neighbor (e.g., the check is failed), then a forwarding inconsistency is detected and the message is held. The held message is not processed until the routing information has converged and the forwarding inconsistency is resolved.

Since multicast control plane messages are typically sent upstream towards a content provider from a downstream neighbor, routing element 130(1) would not expect to receive a multicast control plane message for content provider 210 from an upstream neighbor (e.g., would not expect to receive message 220(3) from routing element 130(3)). Thus, loop avoidance logic module 150 detects a forwarding inconsistency when message 220(3) for content provider 210 is received from upstream neighbor routing element 130(3). This forwarding inconsistency may have occurred due to routing element 130(3) using stale routing information (e.g., as described above) or may have occurred because routing element 130(1)'s routing information is stale. For example, routing element 130(1)'s stale routing information may indicate that routing element 130(3) is an upstream neighbor, while routing element 130(3) is currently a downstream neighbor due to other topology change(s) in the network of which routing element 130(1) is unaware. In this second scenario, although a forwarding inconsistency has been detected, routing element 130(1) should process message 220(3) once its routing information has converged (e.g., message 220(3) does not build a loop, but instead builds tree branch 240 to receiver 140(2)). Thus, rather than drop or discard a message that fails the upstream neighbor check (like a failed forwarding check), loop avoidance logic module 150 holds the message (e.g., message 220(3)) until a time when routing elements 130(1)-(3) have completed convergence. Loop avoidance logic module 150 is further discussed in connection with FIGS. 4A and 4B.

FIG. 3 illustrates an example upstream neighbor list 300 generated by loop avoidance logic module 150 that is implemented on a computing routing element. Upstream neighbor list 300 identifies upstream neighbors of the computing routing element for each content provider whose content is forwarded by computing routing element (also referred to as an active content provider). Upstream neighbor list 300 includes a set of entries 350(1)-(N) that are determined from converged routing information (e.g., at a time before failure 230). Each entry includes a content provider identifier 310 and an associated set of upstream neighbor identifiers that include a set of ECMP (equal cost multi-path) neighbor identifiers 330 (if any) and a set of LFA (loop free alternate) neighbor identifiers 340 (if any). A content provider identifier identifies a source or an RP routing element, and thus can be an IP address (e.g., a source address or an IP address of an RP routing element), a routing element ID (e.g., a number that uniquely identifies an RP routing element), a network address (e.g., a hardware address of the content provider), or other value that identifies a content provider. An upstream neighbor identifier identifies a particular routing element, and thus can be an IP address, a routing element ID, a network address, or another value that identifies the routing element.

For ease of understanding, a primary neighbor identifier 320 is also included in upstream neighbor list 300, although a primary neighbor (e.g., the next-hop routing element on the best path toward the content provider) for each content provider is not necessarily included in an implementation of upstream neighbor list 300 (since the computing routing element can perform a forwarding check to determine any forwarding inconsistencies involving the primary neighbor). Each entry 350 indicates that the computing routing element can reach a content provider via an ECMP neighbor (e.g., the next-hop routing element on an ECMP path toward the content provider) and via an LFA neighbor (e.g., the next-hop routing element on an LFA path toward the content provider). In the embodiment shown, upstream neighbor list 300 identifies the upstream neighbors of routing element 130(1) for active content providers, such as RP routing element 120(1) in entry 350(1) and source 110(1) in entry 350(N).

Upstream neighbor list 300 is updated by loop avoidance logic module 150 in response to receiving updated topology information that indicates changes made in the network topology. Such updated entries are illustrated as entries 360(1)-(N), which reflect changes in the upstream neighbors due to the topology change. For example, entry 350(1) is replaced with updated entry 360(1) that indicates routing element 130(2) is no longer an ECMP neighbor because routing element 130(2) is now in use as the primary neighbor. Also, entry 350(N) is replaced with updated entry 360(N) that indicates routing element 130(2) is no longer an LFA neighbor because routing element 130(2) is now in use as the primary neighbor. Upstream neighbor list 300 is further discussed in connection with FIGS. 4A and 4B.

Figure 4A:
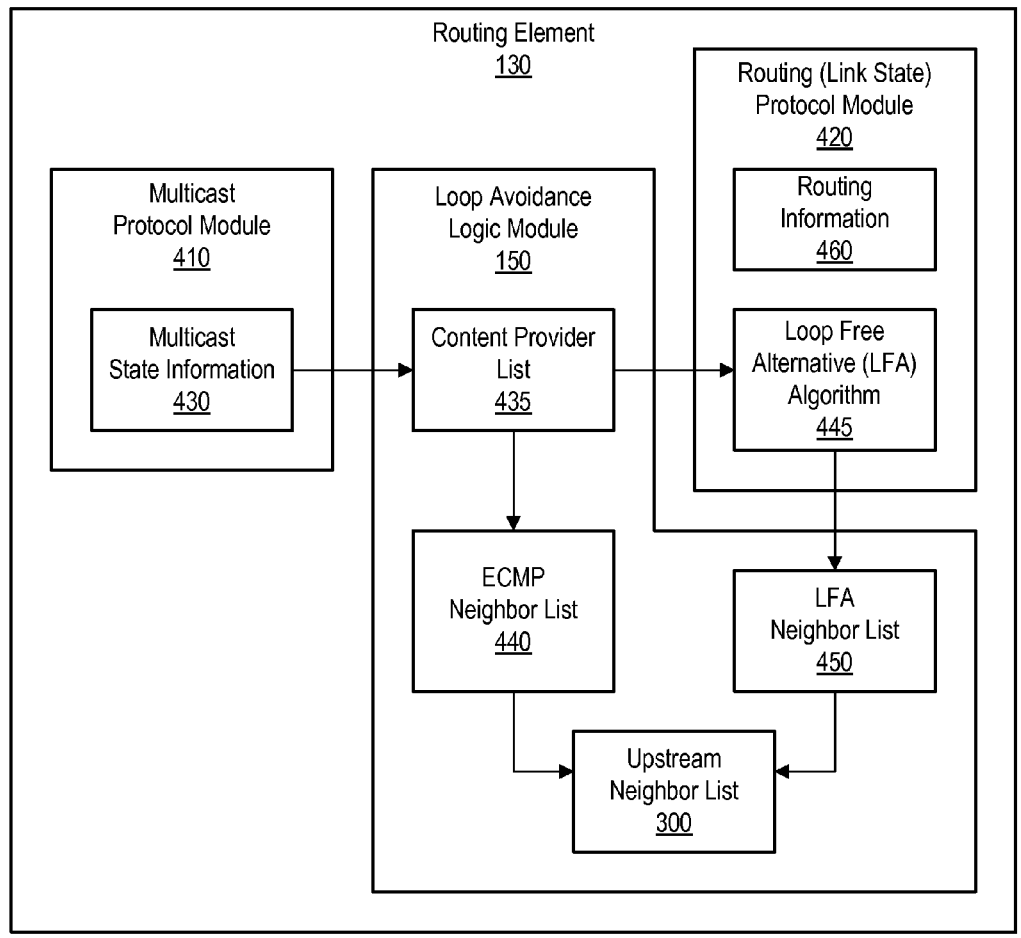
FIGS. 4A and 4B are block diagrams illustrating components of an example loop avoidance logic module in which the present disclosure can be implemented, according to one embodiment.

FIG. 4A is a block diagram illustrating components of an example loop avoidance logic module 150 in which the present disclosure can be implemented. One or more routing elements of routing elements 130(1)-(N) are configured with loop avoidance logic module 150, multicast protocol module 410, and routing protocol module 420. Loop avoidance logic module 150 is configured to communicate with multicast protocol module 410 and routing protocol module 420. Multicast protocol module 410 implements a multicast protocol (such as PIM and/or mLDP) and maintains multicast state information 430. Routing protocol module 420 implements a link state routing protocol (such as OSPF or IS-IS) that supports a loop free alternative (LFA) feature and maintains routing information 460.

Loop avoidance logic module 150 is configured to perform upstream neighbor list generation, which is also described in connection with FIG. 5. The upstream neighbor list is used during a loop avoidance process performed by loop avoidance logic module 150, which is further discussed below in connection with FIGS. 4B and 6. In the embodiments discussed herein, loop avoidance logic module 150 is implemented on a particular routing element 130 of routing elements 130(1)-(N), which is also referred to herein as a computing routing element.

Loop avoidance logic module 150 is configured to determine the complete set of upstream routing elements that are each directly connected to the computing routing element and that are each on a respective path toward an active content provider (such as a source or an RP routing element) whose content is forwarded by the computing routing element. To begin upstream neighbor list generation, loop avoidance logic module 150 is configured to generate a content provider list 435 that identifies one or more active content providers. Loop avoidance logic module 150 is configured to determine the active content providers by consulting multicast state information 430, which stores information identifying each active content provider.

Loop avoidance logic module 150 is also configured to determine any ECMP neighbors for each active content provider listed in content provider list 435 by consulting routing information 460. For each destination in the network, routing information 460 stores a best path (e.g., shortest path based on routing metrics) from the computing routing element to the destination, which is associated with the destination's identifier (such as an IP address or other value that identifies the destination). Although multiple best paths to a destination might exist (such as ECMP paths, which have a same metric cost), a single best path is selected as the primary path to the destination (e.g., by selecting the path having the lowest metric cost, or by selecting the ECMP path via a neighbor routing element that has the highest IP address). A primary neighbor for the content provider is the next-hop routing element on the primary path toward the content provider identifier in routing information 460.

ECMP paths (which are not selected as the primary path) that reach a content provider are considered to be upstream paths toward that content provider (from the computing routing element's point of view). Thus, the next-hop routing element on each ECMP path that reaches a content provider (also referred to herein as an ECMP neighbor) is also considered to be an upstream neighbor for the content provider (where an ECMP neighbor has an upstream interface equivalent to the RPF interface toward the content provider). ECMP paths that are not selected as the primary path can also be associated with the destination's identifier and stored in routing information 460 (e.g., stored as inactive paths or stored as active paths that are used for load-balancing). For each content provider listed in content provider list 435, loop avoidance logic module 150 consults routing information 460, which stores information identifying any ECMP neighbors associated with the content provider.

Loop avoidance logic module 150 also provides content provider list 435 to a loop free alternative (LFA) algorithm 445 supported by routing protocol module 420. LFA algorithm 445 is configured to determine one or more candidate LFAs for each content provider of content provider list 435. A candidate LFA is a neighbor of a computing routing element that is not a primary neighbor of the computing routing element toward a particular destination, whose shortest path to the destination does not loop back through the computing routing element. In other words, a candidate LFA provides an alternative loop-free path to the destination that is distinct from the primary path to the destination. A candidate LFA meets the inequality:

$$Distance\_opt(N,D) < Distance\_opt(N,S) + Distance\_opt(S,D);$$

where Distance_opt (x, y) indicates the shortest distance between nodes x and y,
S is the computing routing element,
N is a neighbor of the computing routing element that is not the primary neighbor, and
D is the destination.

Typically, an LFA feature supported by routing protocol module 420 selects an LFA path via a candidate LFA for use as a backup path in the event of failure (such as an upstream routing element/link failure) on the primary path to the destination. However, in the embodiments discussed herein, such an LFA feature need not be enabled in order for loop avoidance logic module 150 to perform loop avoidance. Rather, loop avoidance logic module 150 uses LFA algorithm 445 to determine one or more candidate LFA paths that reach a particular content provider (or destination), which are considered to be upstream paths toward that content provider (from the computing routing element's point of view). Thus, the next-hop routing element on each candidate LFA path (also referred to herein as a candidate LFA or LFA neighbor) that reaches a particular content provider is considered to be an upstream neighbor for the content provider (where an LFA neighbor has an upstream interface equivalent to the RPF interface toward the content provider). LFA algorithm 445 determines one or more candidate LFAs for each content provider in content provider list 435, without implementing any tie-breakers (which are typically used to select a single candidate LFA for failure switchover purposes). LFA algorithm 445 returns the candidate LFAs determined for each content provider to loop avoidance logic module 150 as an LFA neighbor list 450.

Loop avoidance logic module 150 then combines ECMP neighbor list 440 and LFA neighbor list 450 to produce a master list of known upstream neighbors, also referred to as upstream neighbor list 300. Each entry of upstream neighbor list 300 corresponds to a content provider and identifies the content provider's known upstream neighbors. This set of known upstream neighbors can include one or more ECMP neighbors (if any exist) and one or more LFA neighbors (if any), as discussed above in connection with FIG. 3.

Figure 4B:
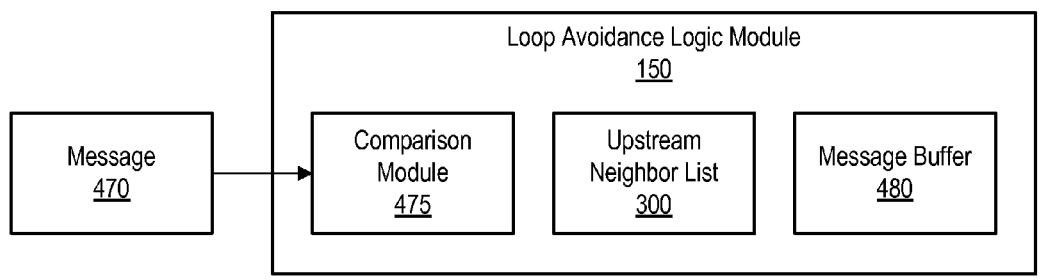

FIG. 4B is a block diagram illustrating components of an example loop avoidance logic module 150 configured to perform a loop avoidance process using the upstream neighbor list 300, which is further discussed in connection with FIG. 6. A multicast control plane message 470 (e.g., a PIM join/prune message or an mLDP label mapping/withdraw message) is received at a computing routing element from a neighbor routing element and the message (or portion thereof) is routed internally to comparison module 475 of loop avoidance logic module 150 (rather than to multicast protocol module 410). Message 470 identifies a datastream, such as by including a tuple that identifies the datastream. Loop avoidance logic module 150 determines an identifier of the content provider of the datastream by consulting multicast state information.

In response to receiving message 470, comparison module 475 is configured to perform an upstream neighbor check on message 470, using upstream neighbor list 300. An upstream neighbor check is performed by determining whether the neighbor routing element (from which the message is received) is identified in the set of upstream neighbors associated with the content provider that provides the datastream identified in message 470.

Comparison module 475 performs a lookup for the content provider (such as by using the content provider's identifier) in the upstream neighbor list 300 to find an entry for the content provider (if any exists). If no entry is found, the upstream neighbor check is passed and message 470 is processed as normal (e.g., the message is routed internally to multicast protocol module 410 for conventional PIM or mLDP processing). If an entry for the content provider is found, comparison module 475 then determines whether the neighbor routing element is identified in the set of upstream neighbors of the entry. If the neighbor routing element is not identified in the set, then message 470 has not been received from an upstream neighbor and has passed the upstream neighbor check. In response, the message is processed as normal.

If the neighbor routing element is identified in the set, then message 470 has been received from an upstream neighbor and has failed the upstream neighbor check because a forwarding inconsistency has been detected. In response, comparison module 475 will hold message 470 in message buffer 480 until a future time when the routing information of the computing routing element and/or neighbor routing elements have converged to reflect the current network topology and the forwarding inconsistency has been resolved. In response to (local) routing information 460 being updated (e.g., routing information 460 converges), loop avoidance logic module 150 is triggered to update (or replace) upstream neighbor list 300 to reflect the converging view of network topology.

Once upstream neighbor list 300 is updated, comparison module 275 performs a subsequent upstream neighbor check on any held messages, such as message 470. If the held message does not pass the upstream neighbor check, the message continues to be held in message buffer. If the held message passes the upstream neighbor check, the message is released and processed as normal without any risk of causing a loop. Thus, (continuing the example described in connection with FIG. 2) if message 220(3) was held due to routing element 130(1)'s stale routing information showing routing element 130(3) as an upstream neighbor, message 220(3) will be released and processed once routing element 130(1)'s routing information converges to reflect routing element 130(3) is a downstream neighbor.

Additionally, (continuing the example described in connection with FIG. 2) if routing element 130(3) sent a tree building message (e.g. a PIM join message or mLDP label mapping message) in error due to routing element 130(3)'s stale routing information, then routing element 130(3) will send a corresponding tear down message (e.g., a PIM prune message or mLDP label withdraw message) to correct the erroneous tree building message, once routing element 130(3)'s routing information has converged. If a corresponding tear down message is received, then both the held (invalid) message 220(3) and corresponding message can be discarded by loop avoidance logic module 150.

Finally, in one embodiment, a message can be held for a pre-defined holding time (ideally, long enough for network convergence to complete). At the expiration of the holding time, if the held message has not been released (e.g., has not passed any upstream neighbor check and no message corresponding to the held message has been received), loop avoidance logic module can determine that the held message is inconsistent with the converged network. Since the held message was most likely sent in error, the message can be safely dropped. In another embodiment, the message can be held indefinitely to prevent loss of the message or to account for network convergence being unusually delayed.

Figure 5:
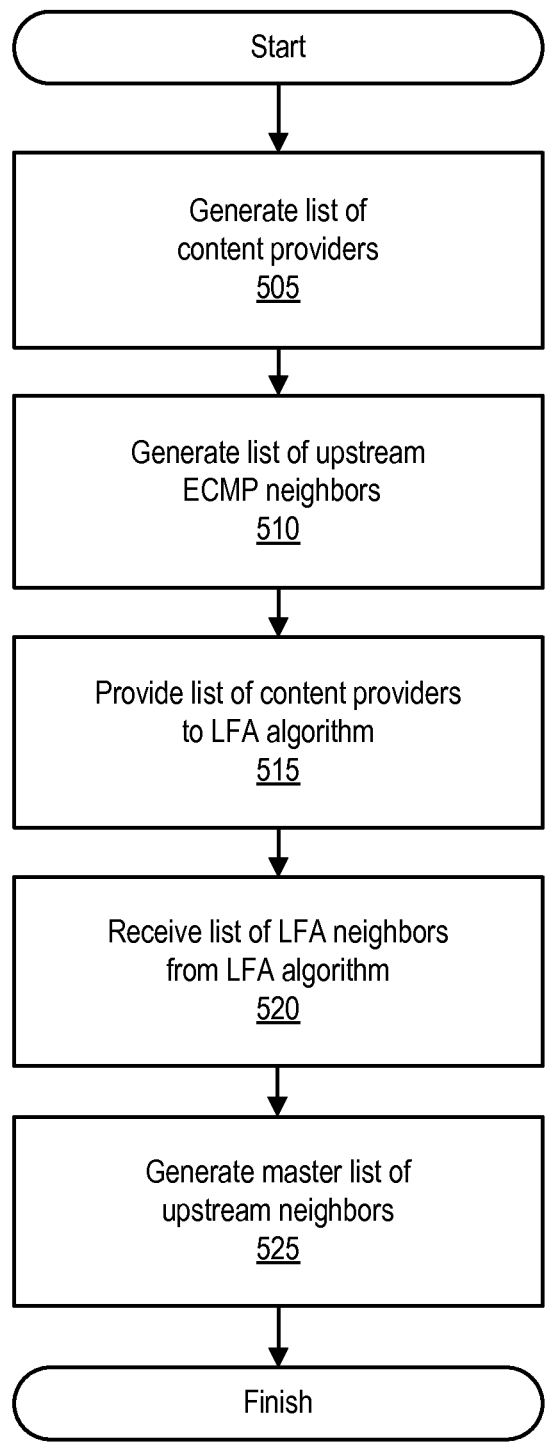
FIG. 5 is a flowchart illustrating acts of an example upstream neighbor list generation process implemented by a loop avoidance logic module, according to one embodiment.

FIG. 5 is a flowchart illustrating acts of an example upstream neighbor list generation process implemented by a loop avoidance logic module configured on a computing routing element, in cooperation with a multicast protocol module and a routing protocol module configured on the computing routing element. The process generates an upstream neighbor list that identifies the upstream neighbors of the computing routing element for each active content provider whose content is forwarded by the computing routing element. The process can be triggered or implemented each time routing information is updated to reflect current network topology (e.g., converges), such as link or node failures (as discussed above) or additions (e.g., a new link or routing element is added) in the network. The process can also be triggered or implemented each time the computing routing element begins forwarding content for a new content provider (e.g., upstream neighbors need to be determined for the new content provider). In one embodiment, a newly-generated upstream neighbor list replaces a previously-generated upstream neighbor list. In another embodiment, the previously-generated upstream neighbor list is updated to reflect the current (converged) network topology (e.g., upstream neighbors are added or removed from the upstream neighbor list, according to the current network topology).

The process begins at operation 505, where loop avoidance logic module generates a list of active content providers (e.g., sources and/or RP routing elements). Loop avoidance logic module retrieves (or triggers multicast protocol module to return) identifiers of the active content providers from multicast state information (e.g., by iterating through multicast state entries and reading source addresses for (S, G) tuples and RP routing element identifiers for (*, G) tuples). Loop avoidance logic module stores the identifiers in the list of active content providers (e.g., store a single identifier instance of each active content provider). In one embodiment (not shown), loop avoidance logic module updates a previously-generated list of active content providers by adding identifiers of newly-available content providers to the list and removing identifiers of newly-unavailable (e.g., removed, retired, inactive, failed) content providers from the list, according to the multicast state information.

The process continues to operation 510, where loop avoidance logic module generates a list of upstream ECMP neighbors, or next-hop routing elements on the ECMP paths that reach each active content provider. Loop avoidance logic module performs (or triggers routing protocol module to perform) a lookup in routing information for each content provider identifier in the list of active content providers to determine any ECMP neighbors for each content provider. Loop avoidance logic module stores an identifier for each ECMP neighbor in the list of upstream ECMP neighbors. The list of upstream ECMP neighbors includes a plurality of entries, where each entry corresponds to a respective active content provider and includes the content provider's identifier and identifier(s) of the content provider's upstream ECMP neighbors (if any exist). In one embodiment (not shown), loop avoidance logic module updates a previously-generated list of upstream ECMP neighbors by adding an entry to the ECMP neighbor list for each newly-available content provider (which includes the ECMP neighbors found for the new content provider) or removing an entry from the ECMP neighbor list for a newly-unavailable content provider. In one embodiment (not shown), loop avoidance logic module also updates the ECMP neighbor list by adding identifiers of newly-available ECMP neighbors to a respective entry or removing identifiers of newly-unavailable ECMP neighbors from the respective entry for each content provider, according to the updated (converged) routing information.

The process continues to operation 515, where loop avoidance logic module provides the (full) list of content providers to a loop free alternate (LFA) algorithm supported by the routing protocol. Although operation 515 is illustrated as occurring after operation 510, operation 515 can occur before or concurrently with operation 510. LFA algorithm is configured to determine LFA neighbors (if any exist) for each active content provider in the list of content providers provided to the LFA algorithm. In one embodiment (not shown), if only multicast state information (and not routing information) is updated to indicate the computing routing element now forwards content for one or more new content providers, a list of the newly-available content providers is provided to the LFA algorithm to determine LFA neighbors for the newly-available content providers (since the network topology has not changed and thus has not affected the LFA neighbors for the other existing content providers). In one embodiment (not shown), if routing information is updated (regardless if multicast state information is updated), the full list of content providers is provided to the LFA algorithm, in order to determine LFA neighbors in the current (converged) network topology.

The process continues to operation 520, where loop avoidance logic module receives a list of LFA neighbors from the LFA algorithm, or next-hop routing elements on the LFA paths that reach each active content provider. The list of LFA neighbors includes a plurality of entries, where each entry corresponds to a respective active content provider and includes the content provider's identifier and identifier(s) of the content provider's LFA neighbors (if any exist). In one embodiment where only multicast state information (and not routing information) has been updated (not shown), a previously-generated list of LFA neighbors can be updated with a set of LFA neighbors for a newly-available content provider received from the LFA algorithm (e.g., a new entry can be added to the previously-generated list of LFA neighbors that includes a newly-available content provider's identifier and identifiers of the content provider's LFA neighbors).

Finally, the process continues to operation 525, where loop avoidance logic module generates a master list of upstream neighbors. The list of upstream neighbors includes a plurality of entries, where each entry corresponds to a respective active content provider and includes the content provider's identifier and identifier(s) of the content provider's associated upstream ECMP neighbors and LFA neighbors (if any exist). In one embodiment (not shown), loop avoidance logic module updates a previously-generated list of upstream neighbors by adding an entry to the upstream neighbor list for each newly-available content provider (which includes the ECMP neighbors and LFA neighbors for the new content provider) or removing an entry from the upstream neighbor list for a newly-unavailable content provider. In one embodiment, loop avoidance logic module also updates the upstream neighbor list by adding identifiers of newly-available ECMP and LFA neighbors to a respective entry or removing identifiers of newly-unavailable ECMP and LFA neighbors from the respective entry for each content provider, according to the updated (converged) routing information. The process then ends.

Figure 6:
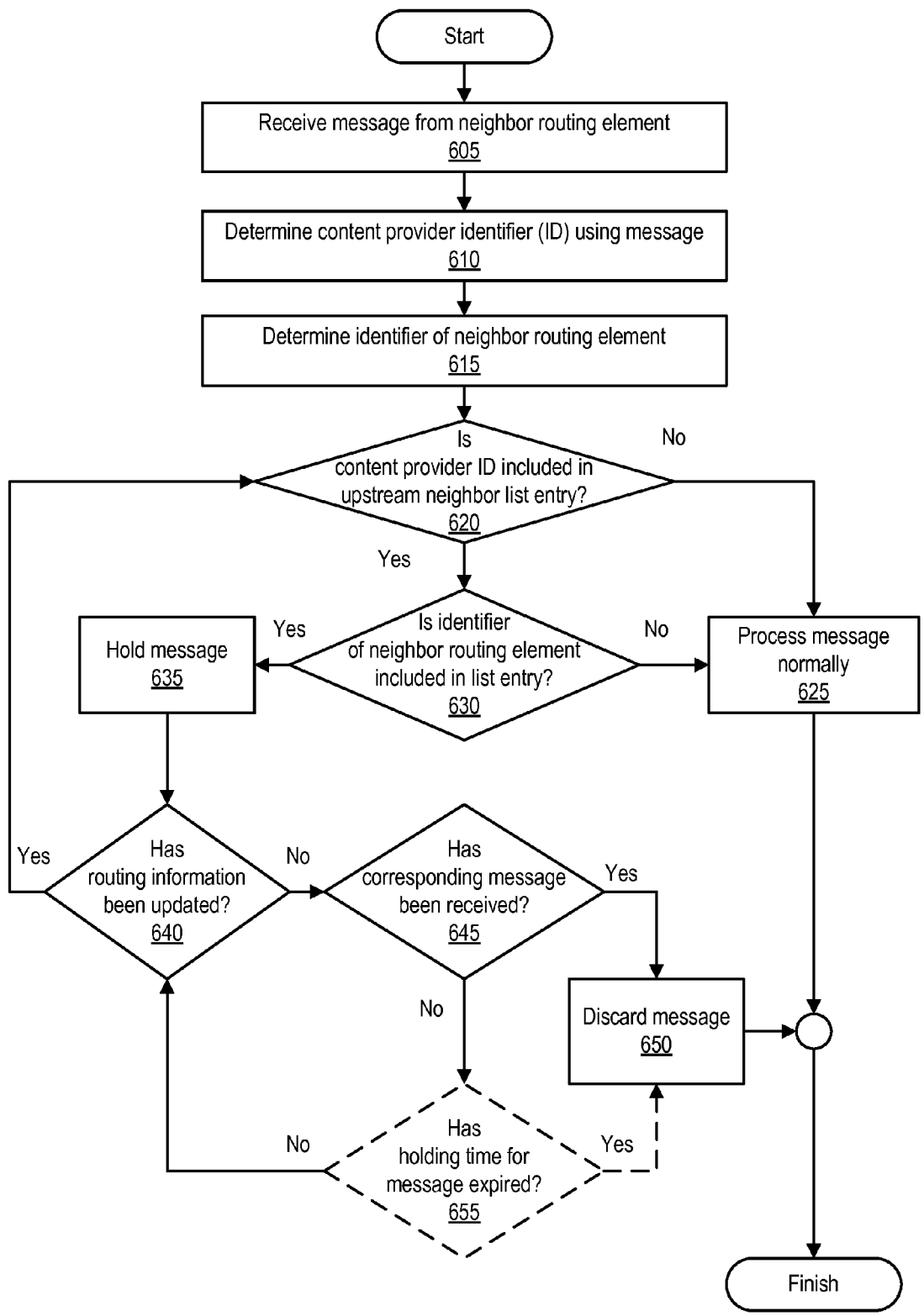
FIG. 6 is a flowchart illustrating acts of an example loop avoidance process implemented by a loop avoidance logic module, according to one embodiment.

FIG. 6 is a flowchart illustrating acts of an example loop avoidance process implemented by a loop avoidance logic module configured on a computing routing element, in cooperation with a multicast protocol module configured on the computing routing element. The process can be triggered or implemented each time a multicast control plane message (e.g., a PIM join message or an mLDP label mapping message) is received at the computing routing element from a neighbor routing element. Upon receipt of the message at a port of the computing routing element that is coupled to the network, loop avoidance logic module intercepts the message (e.g., the message or portion thereof is routed internally to comparison module of loop avoidance logic module rather than to multicast protocol module).

The process begins at operation 605, where comparison module of loop avoidance logic module receives a multicast control plane message (or message) from a neighbor routing element. The process continues to operation 610, where comparison module determines a content provider identifier (ID) using the message. For example, a source can be identified by a source address extracted from the message, and/or a rendezvous point routing element can be identified by a routing element identifier associated with a multicast group address extracted from the message. The process continues to operation 615, where comparison module determines an identifier of the neighbor routing element from which the message is received, such as a routing element identifier.

The process continues to operation 620, where comparison module begins an upstream neighbor check on the received message in operations 620 and 630. In operation 620, comparison module determines whether the content provider identifier is included in an entry of an upstream neighbor list generated for the computing routing element (e.g., whether the content provider identifier matches an identifier in an entry of the upstream neighbor list). If no entry is found for the content provider identifier (e.g., no identifier matching the content provider identifier is found in the upstream neighbor list), the check is passed and the process continues to operation 625, where comparison module provides the message to multicast protocol module for normal (e.g., conventional) message processing. The process then ends.

Returning to operation 620, if an entry is found for the content provider identifier (e.g., an identifier matching the content provider identifier is found in an entry of the upstream neighbor list), the process continues to operation 630, where comparison module determines whether the identifier of the neighbor routing element (from which the message is received) is included in the set of upstream neighbor identifiers that are included in the content provider's upstream neighbor list entry (e.g., whether the neighbor identifier matches an upstream neighbor identifier in the entry). If the neighbor identifier is not included in the set of upstream neighbor identifiers (e.g., no identifier matching the neighbor identifier is found in the entry), the check is passed and the process continues to operation 625, where comparison module provides the message to multicast protocol module for normal (e.g., conventional) message processing. The process then ends.

Returning to operation 630, if the neighbor identifier is included in the set of upstream neighbor identifiers (e.g., an identifier matching the neighbor identifier is found in the entry), the check is failed and the process continues to operation 635, where the message is held (e.g., in a message buffer). The message is held (ideally) until network convergence is complete and any forwarding inconsistencies have been resolved. The process continues to operation 640, where comparison module determines whether (local) routing information has been updated (e.g., routing information of the computing routing element has converged) and better reflects the current network topology. As discussed in connection with FIG. 5, loop avoidance logic module updates the upstream neighbor list in response to an update made to routing information. If routing information has been updated (and the upstream neighbor list has been updated to include or remove upstream neighbors according to the current network topology), the process continues to operation 620 to perform a subsequent upstream neighbor check on the held message. If the check is passed in operation 620 or 630 (e.g., the neighbor from which the (held) message is received is no longer included in the content provider's upstream neighbor list entry, since the converged routing information now indicates the neighbor is a downstream neighbor), comparison module releases the held message and passes the message to multicast protocol module for normal (e.g., conventional) message processing. The process then ends.

Returning to operation 640, if routing information has not been updated, the process continues to operation 645, where comparison module determines whether a subsequent message corresponding to the held message has been received, where the subsequent message is referred to as a corresponding message. For example, if the held message is a tree building message (e.g., a PIM join message or mLDP label mapping message) that was sent in error due to an upstream routing element's stale routing information, then the upstream routing element will send a corresponding tear down message (e.g., a PIM prune message or mLDP label withdraw message) to counteract the erroneous tree building message. If a corresponding message has been received, the process continues to operation 650, where comparison module releases and discards the held message and discards the corresponding message. The process then ends.

Returning to operation 645, if a corresponding message has not been received, the process optionally (illustrated by a broken line) continues to operation 655, where comparison module determines whether a holding time for the message has expired. A holding time can be optionally implemented by comparison module to hold a message until convergence is complete and any forwarding inconsistencies have been resolved. The holding time should be long enough for network convergence to complete, taking typical delay into account. Once the holding time is expired (meaning the network is converged), the process continues to operation 650, where comparison module recognizes that the held message has been sent in error and thus can be safely discarded (e.g., the held message is an erroneous tree building message received from an upstream neighbor and should be discarded). The process then ends.

Returning to operation 655, if the holding time is not expired, the process continues to operation 640, where comparison module again checks whether routing information has been updated. Comparison module can periodically perform operation 655 and operation 645, rather than cycle between the operations continuously.

In one embodiment where holding time is not implemented (where operation 645 returns to operation 640 if no corresponding message is received), the held message is released only when a subsequent upstream neighbor check is passed (and the released message is passed to multicast protocol module in operation 625) or a corresponding message is received (and the released message is discarded in operation 650). This embodiment accounts for unusually long delays in network convergence and is beneficial in an mLDP-controlled network where multicast control plane messages are sent once.

Figure 7:
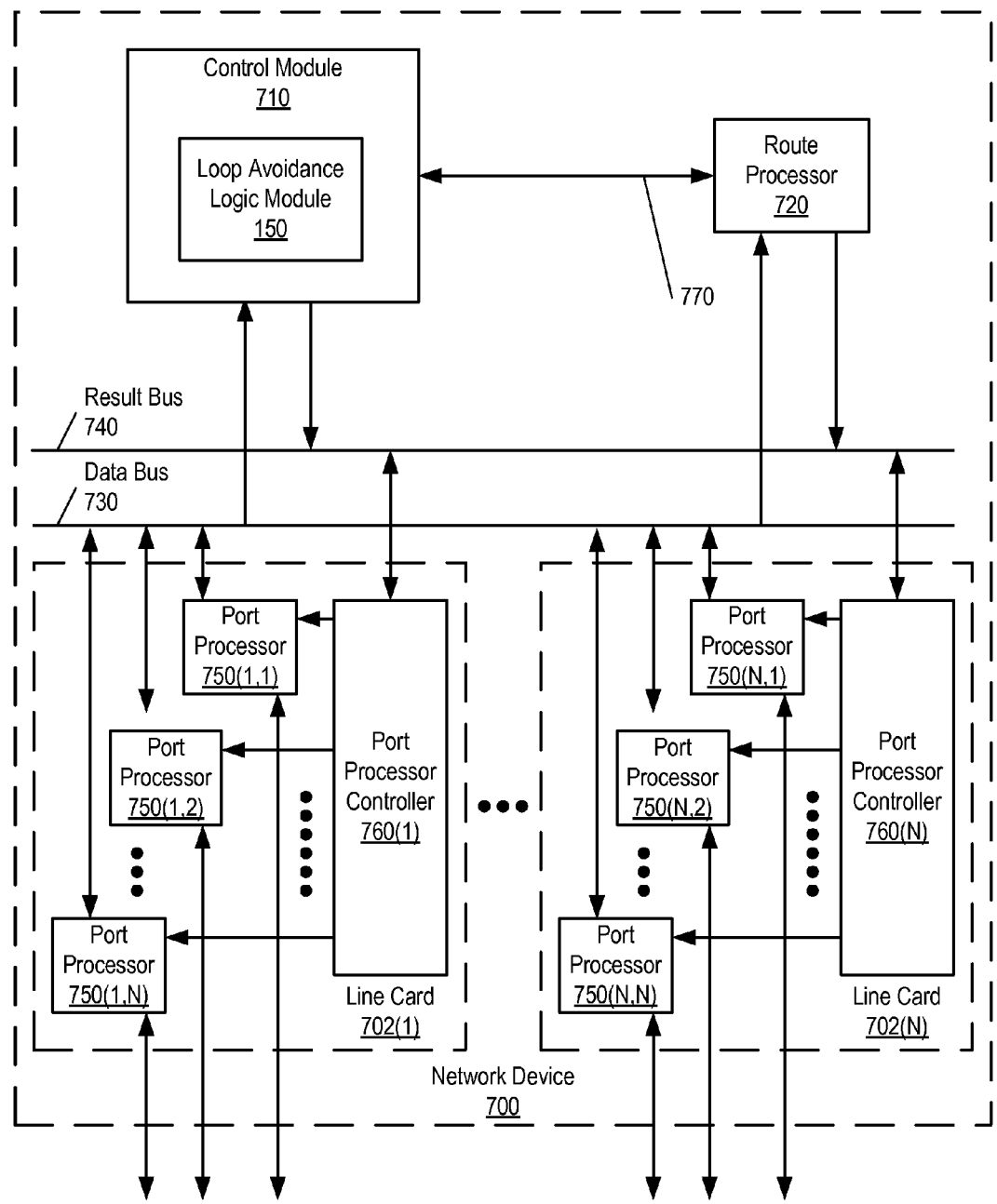
FIG. 7 is a block diagram illustrating components of an example network device in which the present disclosure can be implemented, according to one embodiment.

FIG. 7 is a block diagram illustrating components of an example network device 700 configured as a routing device (e.g., routing elements 130(1)-(N) of FIG. 1). In this depiction, network device 700 includes a number of line cards (line cards 702(1)-702(N)) that are communicatively coupled to a control module 710 (which can include a forwarding engine, not shown) and a route processor 720 via a data bus 730 and a result bus 740. Line cards 702(1)-(N) include a number of port processors 750(1,1)-750(N,N) which are controlled by port processor controllers 760(1)-760(N). It will also be noted that control module 710 and route processor 720 are not only coupled to one another via data bus 730 and result bus 740, but are also communicatively coupled to one another by a communications link 770. It is noted that in alternative embodiments, each line card can include its own forwarding engine.

When a message (e.g., a PIM join/prune message or mLDP label mapping/withdraw message) is received by a network device such as network device 700 (e.g., received by a routing element 130), the message is identified and analyzed by the network device in the following manner. Upon receipt, a message (or some or all of its control information) is sent from one of the port processors 750(1,1)-750(N,N) at which the message was received to one or more of those devices coupled to data bus 730 (e.g., others of port processors 750(1,1)-750(N,N), a forwarding engine, and/or route processor 720). Handling of the message can be determined, for example, by a forwarding engine. For example, a forwarding engine may determine that the message should be forwarded to one or more of port processors 750(1,1)-750(N,N). This can be accomplished by indicating to corresponding one(s) of port processor controllers 760(1)-760(N) that the copy of the message held in the given one(s) of port processors 750(1,1)-750(N,N) should be forwarded to the appropriate one of port processors 750(1,1)-750(N,N).

Network device 700 can implement loop avoidance logic module 150 in control module 710 (as shown), or in one of port processor controllers 760(1)-760(N) and/or in route processor 720 in order to implement the present disclosure. Network device 700 can also implement a multicast protocol module 410 (which implements a multicast protocol such as PIM and/or mLDP) and a routing protocol module 420 (which implements a link state routing protocol such as OSPF or IS-IS) in control module 710, in one of port processor controllers 760(1)-760(N), and/or in route processor 720 (not shown). Loop avoidance logic module 150 is configured to communicate with multicast protocol module 410 and routing protocol module 420. Loop avoidance logic module 150 is configured to perform upstream neighbor list generation, as described above in connection with FIGS. 4A and 5, and loop avoidance processing, as described above in connection with FIGS. 4B and 6.

An incoming message (e.g., a PIM join/prune message and/or an mLDP label mapping/withdraw message) can be provided to loop avoidance logic module 150 and/or multicast protocol module 410 via a forwarding engine or port processor of a line card coupled to a port that received the incoming message. In one embodiment, an incoming message (such as a PIM join/prune message and/or an mLDP label mapping/withdraw message) is provided to loop avoidance logic module 150 (e.g., the incoming message is intercepted by module 150), which is configured to perform an upstream neighbor check as part of loop avoidance processing. The upstream neighbor check indicates whether the incoming message should be processed normally (e.g., passed to multicast protocol module 410 for conventional PIM or mLDP processing) or held until convergence is complete and any forwarding inconsistencies are resolved (e.g., after link state advertisements have been received at routing protocol module 420 and routing information 460 reflects the current view of the network topology). The upstream neighbor check can be performed again, once convergence is complete.

An outgoing message (e.g., a PIM join/prune message and/or mLDP label mapping/withdraw message) can also be generated by multicast protocol module 410 in response to the incoming message. Multicast protocol module 410 can provide the outgoing message to a forwarding engine, which can determine that the outgoing message should be forwarded to one or more of port processors 750(1,1)-750(N,N), which can transmit the outgoing message (e.g., transmitted to another network device in network 105).

Figure 8:
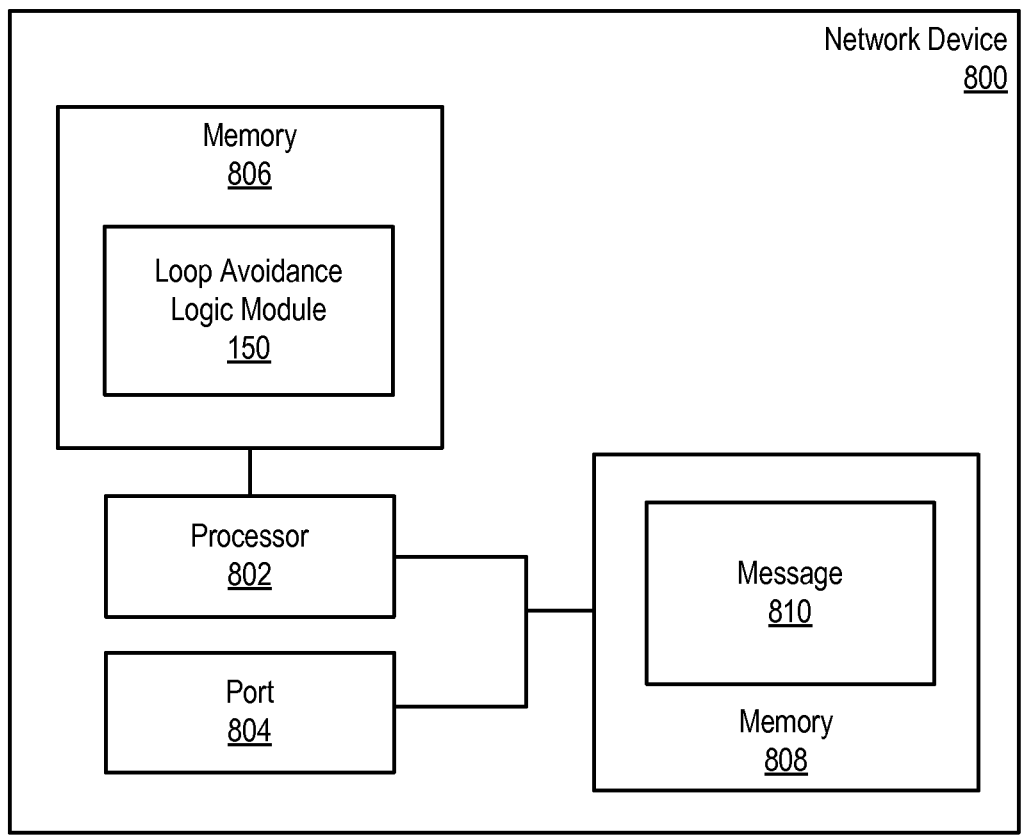
FIG. 8 is a block diagram illustrating components of an example network device in which the present disclosure can be implemented, according to one embodiment.

FIG. 8 is a block diagram illustrating components of an example network device 800, in which the network device is configured as a routing device (e.g., routing elements 130(1)-(N) of FIG. 1). As illustrated, network device 800 includes one or more processors 802 (e.g., microprocessors, PLDs (Programmable Logic Devices), or ASICs (Application Specific Integrated Circuits)) configured to execute program instructions stored in memories 806 and/or 808, which are computer readable storage media. Memories 806 and 808 can include various types of RAM (Random Access Memory), ROM (Read Only Memory), Flash memory, MEMS (Micro Electro-Mechanical Systems) memory, and the like. Network device 800 also includes one or more ports 804 (e.g., one or more hardware ports or other network interfaces that can be linked to other network devices, hosts, servers, storage devices, or the like). Processor 802, port 804, and memories 806 and 808 are coupled to send and receive data and control signals by one or more buses or other interconnects.

In this example, program instructions executable to implement a loop avoidance logic module 150 are stored in memory 806. Upstream neighbor list 300 can also be stored in memory 806 or 808 (not shown). Program instructions executable to implement a multicast protocol module 410 and/or routing protocol module 420 can also be stored in memory 806 and/or in memory 808 (not shown). Multicast state information 430 and routing information 460 can be stored in one or more routing tables and/or forwarding tables, including a multicast routing information base and/or a multicast forwarding information base configured in memory 806 or 808 (not shown).

Message 810 (e.g., a PIM join/prune message and/or an mLDP label mapping/withdraw message) is stored in memory 808. Loop avoidance logic module 150 includes functionality needed to process an incoming message 810 (e.g., an intercepted multicast control plane message). In one embodiment, message 810 can be received from port 804 (e.g., received from another network device coupled to port 804), and can be stored in memory 808 before being provided to loop avoidance logic module 150. Loop avoidance logic module 150 includes the functionality needed to communicate with multicast protocol module 410 and routing protocol module 420 (as described above), to perform upstream neighbor list generation (as described above in connection with FIGS. 4A and 5), and to perform loop avoidance processing (as described above in connection with FIGS. 4B and 6).

Multicast protocol module 410 includes functionality needed to process an incoming message 810 (e.g., received from loop avoidance logic module 150 or received from another network device coupled to port 804) and to generate an outgoing message 810. In one embodiment, message 810 can be generated and stored in memory 808 before being transmitted via port 804 (e.g., transmitted to another network device in network 105 that is coupled to port 804). In another embodiment, message 810 can be received from port 804 (e.g., received from another network device coupled to port 804), and can be stored in memory 808 before being provided to multicast protocol module 410.

Although the present disclosure has been described with respect to specific embodiments thereof, various changes and modifications may be suggested to one skilled in the art. It is intended such changes and modifications fall within the scope of the appended claims.

What is claimed is:

1. A method, comprising:
receiving a message from a neighbor routing element at a routing element, wherein
the message identifies a datastream, and
the datastream is provided by a content provider;
performing an upstream neighbor check, in response to receiving the message, wherein
the upstream neighbor check determines whether the neighbor routing element is one of a plurality of upstream neighbors toward the content provider;
if the neighbor routing element is one of the plurality of upstream neighbors, determining that a forwarding inconsistency is detected, and holding the message in response to the determining that a forwarding inconsistency is detected; and
if the neighbor routing element is not one of the plurality of upstream neighbors, determining that no forwarding inconsistency is detected, and forwarding the message in response to the determining that no forwarding inconsistency is detected.

2. The method of claim 1, wherein
the holding the message comprises storing the message in a message buffer, and
the forwarding the message comprises passing the message to a multicast control plane.

3. The method of claim 2, further comprising:
detecting whether routing information has been updated;
in response to a detection that routing information has been updated, performing a subsequent upstream neighbor check.

4. The method of claim 2, further comprising:
receiving a subsequent message corresponding to the message in the message buffer; and
discarding the message and the subsequent message, in response to receipt of the subsequent message.

5. The method of claim 2, further comprising:
discarding the message from the message buffer, in response to expiration of a holding time associated with the message.

6. The method of claim 1, wherein
the upstream neighbor is a next-hop routing element that has an upstream interface equivalent to a reverse path forwarding (RPF) interface toward the content provider.

7. The method of claim 1, wherein the performing the upstream neighbor check comprises:
determining whether the neighbor routing element is identified in an upstream neighbor list entry associated with the content provider.

8. The method of claim 1, further comprising:
generating an upstream neighbor list used in performing the upstream neighbor check,
wherein
the upstream neighbor list identifies each upstream neighbor of one or more content providers, and
the upstream neighbor list reflects a converged network topology.

9. A non-transitory computer readable storage medium configured to store program instructions that, when executed on a processor, are configured to cause the processor to perform a method comprising:
receiving a message from a neighbor routing element at a routing element, wherein
the message identifies a datastream, and
the datastream is provided by a content provider;
performing an upstream neighbor check, in response to receiving the message, wherein
the upstream neighbor check determines whether the neighbor routing element is one of a plurality of upstream neighbors toward the content provider;
if the neighbor routing element is one of the plurality of upstream neighbors, determining that a forwarding inconsistency is detected, and holding the message in response to the determining that a forwarding inconsistency is detected; and
if the neighbor routing element is not one of the plurality of upstream neighbors, determining that no forwarding inconsistency is detected, and forwarding the message in response to the determining that no forwarding inconsistency is detected.

10. The non-transitory computer readable storage medium of claim 9, wherein the method further comprises:
the holding the message comprises storing the message in a message buffer, and
the forwarding the message comprises passing the message to a multicast control plane.

11. The non-transitory computer readable storage medium of claim 10, wherein the method further comprises:
detecting whether routing information has been updated;
in response to a detection that routing information has been updated, performing a subsequent upstream neighbor check.

12. The non-transitory computer readable storage medium of claim 10, wherein the method further comprises:
receiving a subsequent message corresponding to the message in the message buffer; and
discarding the message and the subsequent message, in response to receipt of the subsequent message.

13. The non-transitory computer readable storage medium of claim 9, wherein the method further comprises:
determining whether the neighbor routing element is identified in an upstream neighbor list entry associated with the content provider.

14. The non-transitory computer readable storage medium of claim 9, wherein the method further comprises:
generating an upstream neighbor list used in performing the upstream neighbor check,
wherein
the upstream neighbor list identifies each upstream neighbor of one or more content providers, and
the upstream neighbor list reflects a converged network topology.

15. An apparatus comprising:
a processor; and
a memory coupled to the processor and configured to store instructions executable by the processor, the instructions configured to
receive a message from a neighbor routing element at a routing element, wherein
the message identifies a datastream, and
the datastream is provided by a content provider;
perform an upstream neighbor check, in response to receiving the message,
wherein the upstream neighbor check determines whether the neighbor routing element is one of a plurality of upstream neighbors toward the content provider;

if the neighbor routing element is one of the plurality of upstream neighbors, determine that a forwarding inconsistency is detected, and hold the message in response to determining that a forwarding inconsistency is detected; and if the neighbor routing element is not one of the plurality of upstream neighbors, determine that no forwarding inconsistency is detected, and forward the message in response to determining that no forwarding inconsistency is detected.

16. The apparatus of claim 15, wherein holding the message comprises storing the message in a message buffer, and forwarding the message comprises passing the message to a multicast control plane.

17. The apparatus of claim 16, wherein the instructions are further configured to:

detect whether routing information has been updated;

perform a subsequent upstream neighbor check, in response to a detection that routing information has been updated.

18. The apparatus of claim 16, wherein the instructions are further configured to:

receive a subsequent message corresponding to the message in the message buffer; and discard the message and the subsequent message, in response to receipt of the subsequent message.

19. The apparatus of claim 15, wherein the instructions are further configured to:

determine whether the neighbor routing element is identified in an upstream neighbor list entry associated with the content provider.

20. The apparatus of claim 15, wherein the instructions are further configured to:

generate an upstream neighbor list used in performing the upstream neighbor check, wherein the upstream neighbor list identifies each upstream neighbor of one or more content providers, and the upstream neighbor list reflects a converged network topology.

21. The method of claim 1, wherein the message is not received at a reverse path forwarding (RPF) interface of the routing element.

* * * * *